(12) United States Patent
Souder et al.

(10) Patent No.: US 10,127,267 B2
(45) Date of Patent: Nov. 13, 2018

(54) HARD COPY STATUS CHECK

(71) Applicant: Autodesk, Inc., San Rafael, CA (US)

(72) Inventors: James Brian Souder, Novato, CA (US); Wayne Gavin Fisher, Benicia, CA (US)

(73) Assignee: AUTODESK, INC., San Rafael, CA (US)

( * ) Notice: Subject to any disclaimer, the term of this patent is extended or adjusted under 35 U.S.C. 154(b) by 246 days.

(21) Appl. No.: 15/053,157

(22) Filed: Feb. 25, 2016

(65) Prior Publication Data

US 2017/0249348 A1    Aug. 31, 2017

(51) Int. Cl.
*G06F 17/30* (2006.01)
*G06F 21/64* (2013.01)

(52) U.S. Cl.
CPC .... *G06F 17/30371* (2013.01); *G06F 17/3023* (2013.01); *G06F 17/30548* (2013.01); *G06F 21/64* (2013.01)

(58) Field of Classification Search
CPC ................................................ G06F 17/30371
See application file for complete search history.

(56) References Cited

U.S. PATENT DOCUMENTS

2013/0252540 A1\* 9/2013 Green .................... H04H 20/72
455/3.05
2014/0201164 A1\* 7/2014 Skinder ............. G06F 17/30899
707/687
2015/0356306 A1\* 12/2015 Carter ................... G06F 21/602
380/246

\* cited by examiner

*Primary Examiner* — Syed H Hasan
(74) *Attorney, Agent, or Firm* — Gates & Cooper LLP

(57) ABSTRACT

A method, apparatus, and system provide the ability to determine a validity of a file. A static image of a first version of the file is output. The outputting includes determining first identifying information that identifies the first version of the file, generating a first reference identifier that is associated with the first identifying information, storing the first reference identifier, and generating the static image that includes a visual representation of the first reference identifier. A second reference identifier (that is associated with second identifying information that identifies a second version of the file) is received. Based on the second identifying information, a determination is made regarding which version of the file is more recent. A validity or invalidity of the second version of the file is confirmed based on the determination.

18 Claims, 4 Drawing Sheets

HARD COPY STATUS CHECK

BACKGROUND OF THE INVENTION

1. Field of the Invention

The present invention relates generally to document management, and in particular, to a method, apparatus, and article of manufacture for determining if a printed/static copy of a drawing, design, drawing set, etc. is the most up-to-date version of the master document.

2. Description of the Related Art

Designs, drawings, documents, etc. (referred to hereafter as "designs") are frequently created and used in the architectural, engineering, and construction (AEC) industry. Computer-aided design (CAD) software applications may be utilized to create such designs. Users may be provided with the ability to sign a design so that it could be known if the design had been touched/altered. Further, CAD applications may provide the ability to store such designs on the software provider's server. Access to the centrally/remotely stored designs may distributed to other users authorized by the design owner. Providing a single online storage capability of a design enables easy and efficient version management (i.e., the latest version is always at a particular location). However, often times, users/customers may not be comfortable placing their proprietary designs and data online with another company (e.g., the software provider or host). In addition, without central storage, multiple conflicting local versions of a design often result. Accordingly, it is desirable to provide an efficient and easy mechanism for maintaining version control while storing a CAD design locally (e.g., without storing a copy of the latest version online).

SUMMARY OF THE INVENTION

Embodiments of the invention provide the ability to determine if a printed/static version of a drawing, design, drawing set, etc. is the most up-to-date version of the master document. In other words, embodiments of the invention provide the ability to answer the question "Has the design changed since the printed/static copy was produced?"

To enable such a capability, design software/a project management application produces and stores a checksum of the last saved (e.g., most recent) version of the design document. When the printed hardcopy/static version of the document is produced, a reference to the checksum may be printed/displayed/stored on/in the hardcopy/static version. Instructions on how to use the reference to the checksum may also be printed/displayed/stored on the hardcopy/static version. A user merely provides the reference number printed/displayed/stored on the hardcopy/static version to an online provider (e.g., the design software/project management application) (e.g., via the user's cell phone, website, short message service [SMS], etc.), and the online provider/server determines if the checksum associated with reference received from the user is the same as the latest checksum associated with the most recent version of the design document. Such a determination ascertains/establishes if the user's version is the latest/most recent version.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide the ability for a user to confirm whether a specific copy of a design/drawing is the most recent version of the design/drawing without requiring online storage/access to the design/drawing itself.

Hardware Environment

Figure 1:
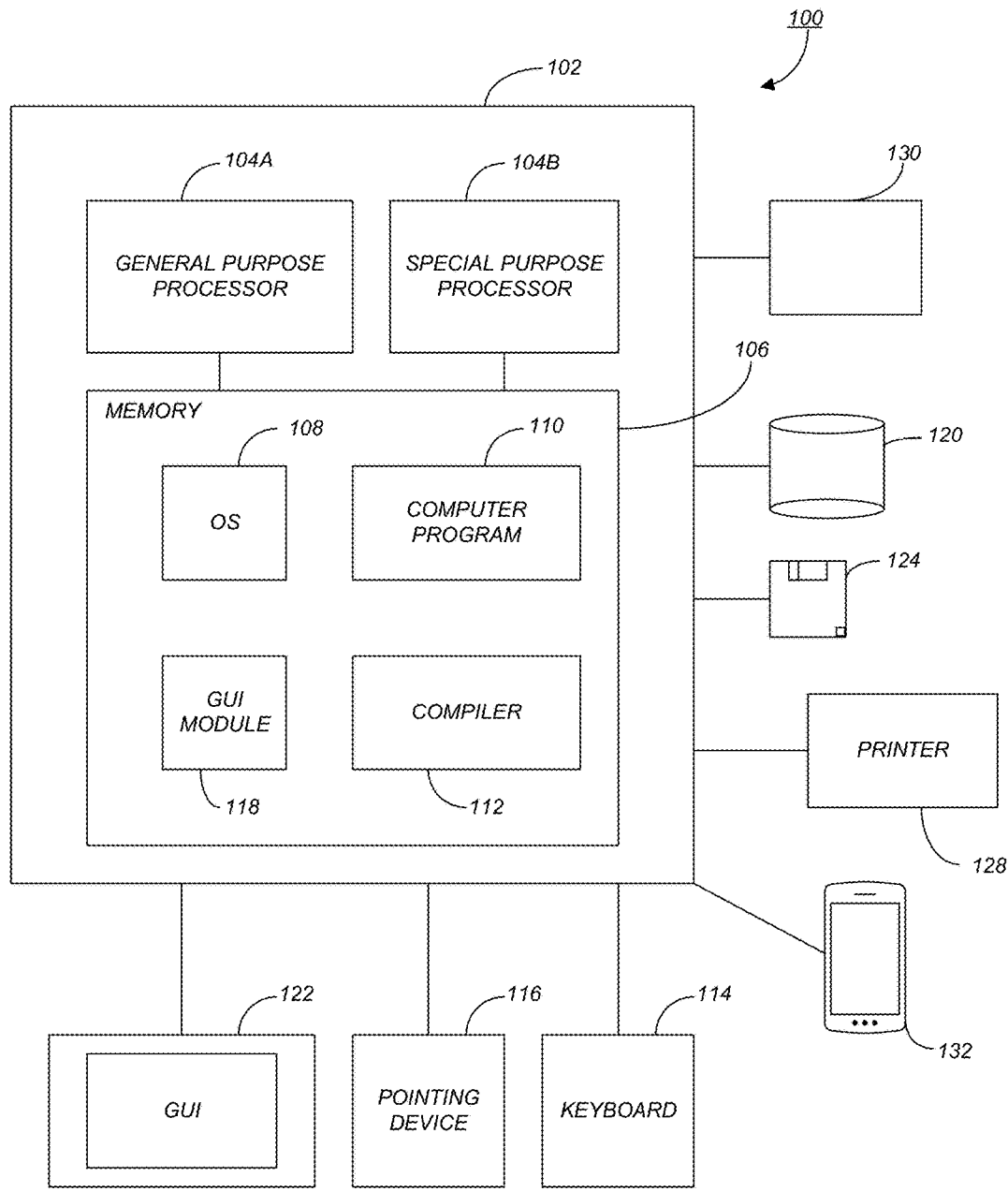
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, IPOD, NOOK, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as C, C++, Assembly, SQL, PYTHON, PROLOG, MATLAB, RUBY, RAILS, HASKELL, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transitory computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
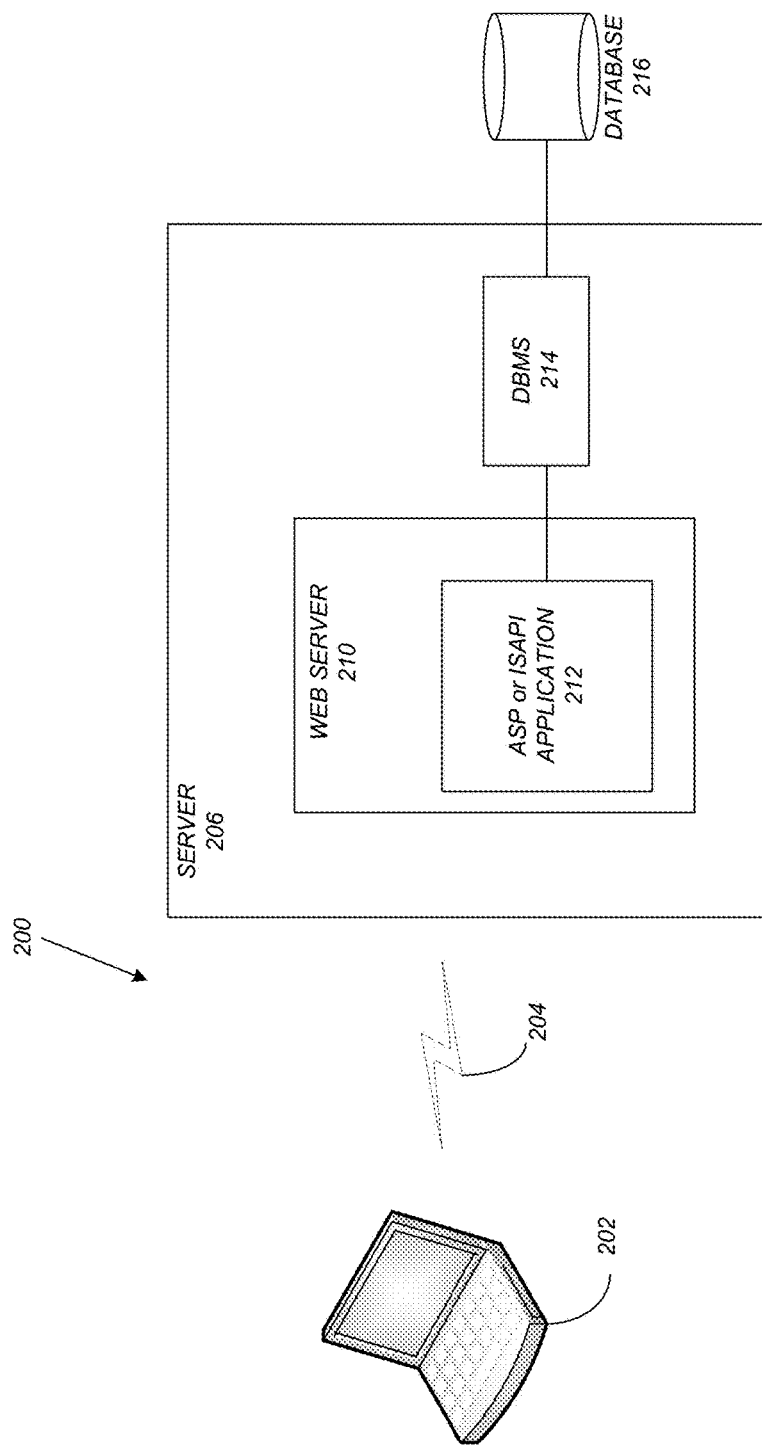
FIG. 2 schematically illustrates a typical distributed/cloud-based computer system using a network to connect client computers to server computers in accordance with one or more embodiments of the invention.

FIG. 2 schematically illustrates a typical distributed/cloud-based computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Further, in a cloud-based computing system, resources (e.g., storage, processors, applications, memory, infrastructure, etc.) in clients 202 and server computers 206 may be shared by clients 202, server computers 206, and users across one or more networks. Resources may be shared by multiple users and can be dynamically reallocated per demand. In this regard, cloud computing may be referred to as a model for enabling access to a shared pool of configurable computing resources.

Clients 202 may execute a client application or web browser and communicate with server computers 206 executing web servers 210. Such a web browser is typically a program such as MICROSOFT INTERNET EXPLORER, MOZILLA FIREFOX, OPERA, APPLE SAFARI, GOOGLE CHROME, etc. Further, the software executing on clients 202 may be downloaded from server computer 206 to client computers 202 and installed as a plug-in or ACTIVEX control of a web browser. Accordingly, clients 202 may utilize ACTIVEX components/component object model (COM) or distributed COM (DCOM) components to provide a user interface on a display of client 202. The web server 210 is typically a program such as MICROSOFT'S INTERNET INFORMATION SERVER.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S TRANSACTION SERVER (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206.

Software Embodiment Overview

Embodiments of the invention are implemented as a software application on a client 202 or server computer 206. Further, as described above, the client 202 or server computer 206 may comprise a thin client device or a portable device that has a multi-touch-based display.

Software Embodiment Details

A process and technology can determine if the printed/static copy of a drawing, design, drawing set, etc. is the most up-to-date/recent version of the master document. The design software/project management produces and stores a checksum of the last saved version (i.e., the most recent version) of the design document. When the printed/static hardcopy is produced, a reference to the checksum is printed on the hardcopy/static copy along with instructions on how to use the reference. To utilize the reference, customers/users (e.g., a person holding the hardcopy in the field) would provide the reference number stored on the hardcopy/static copy to a confirming entity/application (e.g., via cell phone, a website, SMS, etc.). The confirming entity/application determines if the checksum associated with the provided reference number is the same as checksum associated with the most recent version. Such an action would determine if the hardcopy/static copy is the most recent version of the document. The determination could then be communicated to the customer/user.

The above basic idea may be extended in many ways. For example, each printed page could be "rolled up" into an entire set of design documents. Checking the "set" could inform the user which pages had changed. In addition, this idea could be extended to any type of "document" (e.g., a word processing document, a spreadsheet, an image, or any document that is capable of being printed/saved/imaged into a static form). Embodiments of the invention could also be extended through numerous "workflow" options.

To enable embodiments of the invention, a server may store metadata information about each file and can determine if a file (e.g., a design file) has changed and which one is newer/older than another copy of the file. In this regard, only the metadata (and not the actual file itself) may be stored online. The metadata may include version number and a digital signature (e.g., an MD5 digest or checksum). In this regard, all documents within a network (e.g., an intranet) or documents shared amongst multiple users may have associated metadata with versioning information. Copies of documents/designs could leave the network (e.g., via email) and applications/users could still check for revisions (e.g., via the Internet by accessing the metadata). The metadata may be embedded into a printed/static copy of the file. For example, a hardcopy/static copy may have a "1-800" number (or a bar code/hash/etc.) on the hardcopy/static copy that would be used to place a call (e.g., an automated call) to the server to check for a new version. In this regard, whenever a design/document is opened that contains the metadata, a check may be performed.

Thus, utilizing embodiments of the invention, users may store the actual document locally, on a peer, or centrally, while maintaining the ability to determine/ensure that the most recent version of the document is being used (via a server that does not need to actually store the file itself). Different workflows may enable such a determination. For example, in one workflow, if the server determines that the most recent version is not being used, the user may be notified (e.g., via a message). Alternatively, if a digital static image is being accessed/opened by the user, the user may be disabled from opening/viewing/saving their old version.

Different workflows may apply to a set of drawings in a design. For example, the reference information may determine that all drawings in the drawing set are the most recent version except for sheet 4. Further, information regarding how sheet 4 is different may also be stored and/or provided to the user.

Figure 3:
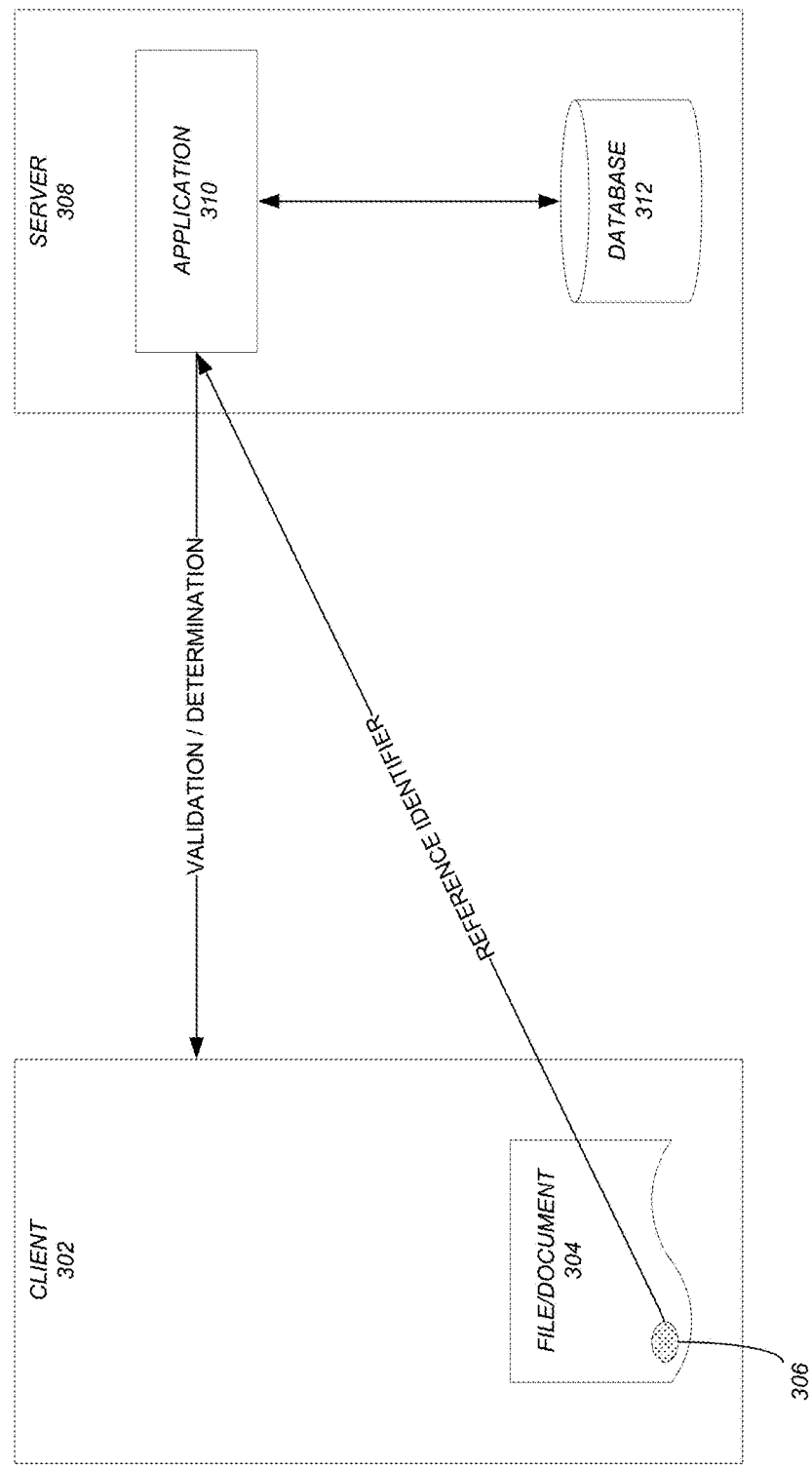
FIG. 3 illustrates a component diagram utilized to validate a file in accordance with one or more embodiments of the invention.

FIG. 3 illustrates a component diagram utilized to validate a file (e.g., determine if a version of a file is the most recent version) in accordance with one or more embodiments of the invention. Client 302 has a static version of a file/document 304. The static version includes a user interface element 306 such as a bar code, a QR (Quick Response) code, reference number, an 800 number, a uniform resource locator (URL), etc.

Client 302 desires to confirm that file/document 304 is the most recent version of the file/document being shared amongst multiple users. To perform such confirmation, client 302 calls/sends/transmits information (e.g., the reference identifier) in the user interface element 306 to server 308. Application 310 in server 308 is tasked with validating file document 304. Application 310 accesses database 312 to determine the checksum associated with the reference identifier (i.e., if the reference identifier does not consists of the checksum itself). The checksum is then compared to a checksum associated with the most recent version of file/document 304 (e.g., in database 312).

Database 312 (or other memory within server 308) may only include the checksum associated with the most recent version of file/document 304. Thus, if the checksum associated with the version of file/document 304 in the possession of client 302 is not present in database 312, it may be determined/concluded that the version of file/document 304 in the possession of client 302 is not the most recent version. Alternatively, information on the various versions may be maintained in database 312. Once application 310 has completed a determination, application 310 may confirm/communicate such a determination with client 302.

Logical Flow

Figure 4:
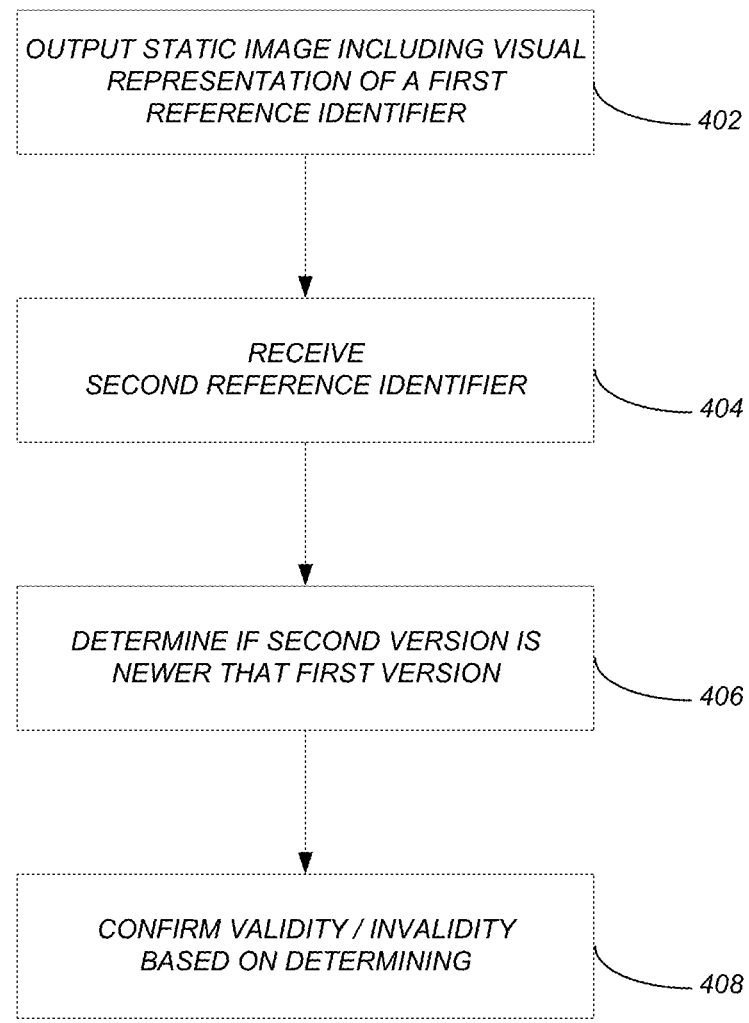
FIG. 4 illustrates the logical flow for validating a file in accordance with one or more embodiments of the invention.

FIG. 4 illustrates the logical flow for validating a file in accordance with one or more embodiments of the invention.

At step 402, a static image of a first version of a file is output. The outputting consists of: (a) determining first identifying information that identifies the first version of the file; (b) generating a first reference identifier that is associated with the first identifying information; (c) storing the first reference identifier; and (d) generating the static image that comprises a visual representation of the first reference identifier.

The file may be an architectural design document and the static image may be a static image of the architectural design document (e.g., a printed blueprint, a portable document format [PDF] of the design document, a JPEG, a PNG, etc.). Alternatively, the static image may be a printed hardcopy of the first version of the file (e.g., a printed copy of a word processing document, image, design document, etc.). The first reference identifier may include attribute data (e.g., metadata and/or other information such as a file name, when the file was created, when the file was modified, etc.) describing the first version of the file. Further, the visual representation may be a uniform resource locator (URL), a 1-800 number, a bar code, a QR code, etc.

At step 404, a second reference identifier is received. The second reference identifier is associated with second identifying information that identifies a second version of the file.

At step 406, based on the second identifying information, a determination is made regarding whether the second version of the file is newer than the first version of the file. To determine whether the second version is newer, the second identifying information may be compared to the first identifying information. Based on the comparison, if the second identifying information and the first identifying information are the same, it may be concluded that the second version of the file is the most recent version. Alternatively, if the second identifying information and the first identifying information are different, it may be concluded that the second version of the file is older than the first version of the file. In other words, the identifying information for the most recent version is stored and compared to the second identifying information received from a user that is attempting to validate/determine if he/she is utilizing the most recent version of the file. In this regard, in one or more embodiments, the identifier for the most recent version of the file is stored in an online database and reference identifiers for older versions of the file are not stored/maintained in the online database.

At step 408, the validity or invalidity of the second version of the file is confirmed based on the determining (i.e., performed at step 406). Change information describing the differences between the first version and second version may also be provided. In this regard, the static image of the version of the file may consist of multiple pages of a set of design documents such that the first reference identifier is representative of the entire set. Thereafter, the confirmation identifies which page of the multiple pages has changed.

In view of the above, the latest/most recent version of the file may remain in local storage (or may be stored online), and the tiny piece of attribute data is all that is necessary to determine if a file is the most recent version or not. Whenever a print/static version of a file is output, the outputting entity/person may opt to void prior versions (e.g., indicate that older versions are now defunct/old). Thus, a user may take action to output a new static version of a file. At the time of such action, a system may first determine that the base version is the most recent version (e.g., before invalidating any prior version, a determination may be performed to ensure that there are no intermediate versions (of the file) in between the version the user opened and the user's current version that is being output. If no intermediate versions are found, the older version may be invalidated merely by storing the new identifying information (e.g., a checksum) for the file. Further, at the time of outputting the version, the user may be requested to input information regarding the latest version or changes performed to create the latest version (e.g., to input information about the changes performed or how to retrieve the latest version).

Accordingly, in one or more embodiments, only identifying information for the most recent version may be maintained/stored. Consequently, to determine if a version is the most recent version, a simple comparison of the identifying information for a given version may be compared to the identifying information maintained/stored on a server (that corresponds to the most recent version). Thus, only identifying information needs to be maintained/stored on a server instead of the actual file.

In an exemplary workflow, a person building a hospital/building may have a roll of blue prints where each blue print (or the set of blueprints) has a visual representation printed thereon that can be used to verify/validate the version of the blueprint. The person simply uses the visual representation to provide/retrieve the identifying information for the blueprint/set of blue prints. The provided/retrieved identifying information is utilized by a confirming entity that compares the provided/retrieved identifying information to the identifying information associated with the most recent version of the file (which may be maintained in an online database). The comparison is then utilized to verify whether the most recent version of the file is in the user's possession. If the person is utilizing an older version, the confirming entity may provide the user with the option to retrieve/download the most recent version and/or may provide the user instructions regarding where the most recent version may be obtained.

In addition to the above, exemplary workflows may include the ability to provide information based on the identity of the user. For example, if a cement construction/field worker is sending in/uploading the most recent version of a scanned document, the identity of the cement construction/field worker may be requested/stored/associated with the document (e.g., as part of the metadata). Thereafter, based on other user's roles associated with the identity of the user, differences in the document/file may be identified/provided/retrievable. For example, for a plumbing contractor role, information about changes to the electrical system (that does not interfere with the plumbing) may not be provided to the plumbing contractor. Instead, different "most recent" versions of a file may be maintained on a user-role basis as long as such roles and changes are not conflicting. Consequently, one set of blueprints may be used for plumbing contractors and other sets may be used for electrical contractors. Users can subscribe to particular sets of blueprints/documents so that they are made aware of changes that may impact and/or affect their work. Thus, based on permissions, a plumbing contractor may be permitted to subscribe to the electrical set of blueprints but may not have write access/privileges. In this manner, different users and different user roles may be integrated into the validation process.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for validating a file, comprising:
   (a) outputting a static image of a first version of the file, wherein the outputting comprises:
      (1) determining first identifying information that identifies the first version of the file;
      (2) generating a first reference identifier that is associated with the first identifying information;
      (3) storing the first reference identifier in a database, wherein only the first reference identifier is stored in the database and not the first version of the file;
      (4) generating the static image that comprises a visual representation of the first reference identifier;
   (b) receiving a second reference identifier that is associated with second identifying information that identifies a second version of the file;
   (c) determining, based on the second identifying information, whether the second version of the file is newer than the first version of the file, wherein the determining comprises:
      (1) comparing the second identifying information to the first identifying information;
      (2) determining that the second version of the file is a most recent version if the second identifying information and the first identifying information are the same; and
      (3) determining that the second version of the file is older than the first version of the file if the second identifying information and the first identifying information are different; and
   (d) confirming a validity or invalidity of the second version of the file based on the determining step (c).

2. The computer-implemented method of claim 1, wherein:
   the file comprises an architectural design document; and
   the static image comprises a static image of the architectural design document.

3. The computer-implemented method of claim 1, wherein the first identifying information comprises a checksum.

4. The computer-implemented method of claim 1, wherein the static image comprises a printed hardcopy of the first version of the file.

5. The computer-implemented method of claim 1, wherein the first reference identifier comprises attribute data describing the first version of the file.

6. The computer-implemented method of claim 1, wherein the visual representation comprises a uniform resource locator (URL).

7. The computer-implemented method of claim 1, wherein a reference identifier for the most recent version of the file is stored in an online database, and reference identifiers for older versions of the file are not stored in the online database.

8. The computer-implemented method of claim 1, further comprising:
   providing change information describing differences between the first version and the second version.

9. The computer-implemented method of claim 1, wherein:
   the static image of the version of the file comprises multiple pages of a set of design documents;
   the first reference identifier is representative of the set; and
   the confirming identifies which page of the multiple pages has changed.

10. A server computer for validating a file:
    (a) the server computer having a memory;
    (b) an application executing on the server computer, wherein the application is configured to:
       (1) output a static image of a first version of the file, wherein the outputting comprises:
          (A) determine first identifying information that identifies the first version of the file;
          (B) generate a first reference identifier that is associated with the first identifying information;
          (C) store the first reference identifier in a database, wherein only the first reference identifier is stored in the database and not the first version of the file;
          (D) generate the static image that comprises a visual representation of the first reference identifier;
       (2) receive a second reference identifier that is associated with second identifying information that identifies a second version of the file;
       (3) determine, based on the second identifying information, whether the second version of the file is newer than the first version of the file, wherein the application determines by:
          (A) comparing the second identifying information to the first identifying information;
          (B) determining that the second version of the file is a most recent version if the second identifying information and the first identifying information are the same; and
          (C) determining that the second version of the file is older than the first version of the file if the second identifying information and the first identifying information are different; and
       (4) confirm a validity or invalidity of the second version of the file based on the determination.

11. The server computer of claim 10, wherein:
    the file comprises an architectural design document; and
    the static image comprises a static image of the architectural design document.

12. The server computer of claim 10, wherein the first identifying information comprises a checksum.

13. The server computer of claim 10, wherein the static image comprises a printed hardcopy of the first version of the file.

14. The server computer of claim 10, wherein the first reference identifier comprises attribute data describing the first version of the file.

15. The server computer of claim 10, wherein the visual representation comprises a uniform resource locator (URL).

16. The server computer of claim 10, wherein a reference identifier for the most recent version of the file is stored in an online database, and reference identifiers for older versions of the file are not stored in the online database.

17. The server computer of claim 10, wherein the sever computer is further configured to:
   provide change information describing differences between the first version and the second version.

18. The server computer of claim 10, wherein:
   the static image of the version of the file comprises multiple pages of a set of design documents;
   the first reference identifier is representative of the set; and
   the server computer further identifies which page of the multiple pages has changed.

* * * * *